US012683770B2

(12) United States Patent
Cho et al.

(10) Patent No.: US 12,683,770 B2
(45) Date of Patent: Jul. 14, 2026

(54) SYSTEMS AND METHODS FOR SECURE MODULAR HARDWARE BINDING

(71) Applicant: Dell Products, L.P., Round Rock, TX (US)

(72) Inventors: Eugene David Cho, Austin, TX (US); Travis Gilbert, Round Rock, TX (US); Milton Olavo Decarvalho Taveira, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 279 days.

(21) Appl. No.: 18/450,145

(22) Filed: Aug. 15, 2023

(65) Prior Publication Data

US 2025/0062891 A1 Feb. 20, 2025

(51) Int. Cl.
H04L 9/08 (2006.01)
(52) U.S. Cl.
CPC .......... H04L 9/0825 (2013.01); H04L 9/0894 (2013.01)
(58) Field of Classification Search
CPC ............................ H04L 9/0825; H04L 9/0894
USPC ........................................................ 726/23
See application file for complete search history.

(56) References Cited

U.S. PATENT DOCUMENTS

| | | | |
|---|---|---|---|
| 2022/0035956 A1* | 2/2022 | Porter | G06F 21/73 |
| 2022/0198018 A1* | 6/2022 | Wentz | H04L 9/3268 |
| 2023/0315913 A1* | 10/2023 | Chandra | G06F 21/572 |
| | | | 726/26 |

* cited by examiner

*Primary Examiner* — Linglan Edwards
*Assistant Examiner* — Phuc Pham
(74) *Attorney, Agent, or Firm* — Fogarty LLP

(57) ABSTRACT

Systems and methods for secure modular hardware binding in a Data Center Modular Hardware System (DC-SCM) environment are described herein. According to one embodiment, an Information Handling System (IHS) includes multiple Complex Programmable Logic Devices (CPLDs), and computer-executable logic to, for each of the CPLDs: store an encrypted secret key in a platform Root-of-Trust (RoT) and the CPLD, and receive, by the platform RoT, a request to authenticate a firmware stack installed on the CPLD. The logic may then present, by the CPLD, an encrypted secret key to the platform RoT, authenticate, by the platform RoT, the firmware stack by comparing the encrypted secret key received from the CPLD with its stored version of the encrypted secret key, and allow operation of the CPLD based on the authentication.

15 Claims, 8 Drawing Sheets

800

SYSTEMS AND METHODS FOR SECURE MODULAR HARDWARE BINDING

BACKGROUND

The Open Compute Project's (OCP) Datacenter-Modular Hardware System (DC-MHS) sub-project is directed to interoperability between elements of datacenter, edge, and enterprise infrastructure. DC-MHS provides consistent interfaces and form factors among modular building blocks. DC-MHS standardizes a collection of form-factors and supporting ingredients to allow interoperability between different platforms. The Security Protocol and Data Model (SPDM) specification defines messages, data objects, and sequences for performing message exchanges between devices over a variety of transport and physical media. The description of message exchanges includes authentication and provisioning of hardware identities, measurement for firmware identities, session key exchange protocols to enable confidentiality with integrity protected data communication and other related capabilities.

Datacenter, edge, and enterprise infrastructure may include various Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

Systems and methods for secure modular hardware binding in a Data Center Modular Hardware System (DC-SCM) environment are described herein. According to one embodiment, an Information Handling System (IHS) includes multiple Complex Programmable Logic Devices (CPLDs), and computer-executable logic to, for each of the CPLDs: store an encrypted secret key in a platform Root-of-Trust (RoT) and the CPLD, and receive, by the platform RoT, a request to authenticate a firmware stack installed on the CPLD. The logic may then present, by the CPLD, an encrypted secret key to the platform RoT, authenticate, by the platform RoT, the firmware stack by comparing the encrypted secret key received from the CPLD with its stored version of the encrypted secret key, and allow operation of the CPLD based on the authentication.

According to another embodiment, a secure modular hardware binding method includes the steps of, for each of a plurality of Complex Programmable Logic Devices (CPLDs), storing an encrypted secret key in a platform Root-of-Trust (RoT) and the CPLD, receiving, by the platform RoT, a request to authenticate a firmware stack installed on the CPLD, and presenting, by the CPLD, an encrypted secret key to the platform RoT. The method further includes the steps of authenticating, by the platform RoT, the firmware stack by comparing the encrypted secret key received from the CPLD with its stored version of the encrypted secret key, and allowing operation of the CPLD based on the authentication.

According to yet another embodiment, a computer program product including a computer readable storage medium having program instructions stored thereon that, upon execution by a Datacenter-Modular Hardware System (DC-MHS), cause the DC-MHS to, for each of a plurality of Complex Programmable Logic Devices (CPLDs), store an encrypted secret key in a platform Root-of-Trust (RoT) and the CPLD, receive, by the platform RoT, a request to authenticate a firmware stack installed on the CPLD, and present, by the CPLD, an encrypted secret key to the platform RoT. The program instruction further cause the DC-MHS to authenticate, by the platform RoT, the firmware stack by comparing the encrypted secret key received from the CPLD with its stored version of the encrypted secret key, and allow operation of the CPLD based on the authentication.

BRIEF DESCRIPTION OF THE DRAWINGS

The present invention(s) is/are illustrated by way of example and is/are not limited by the accompanying figures. Elements in the figures are illustrated for simplicity and clarity and have not necessarily been drawn to scale.

DETAILED DESCRIPTION

Figure 1:
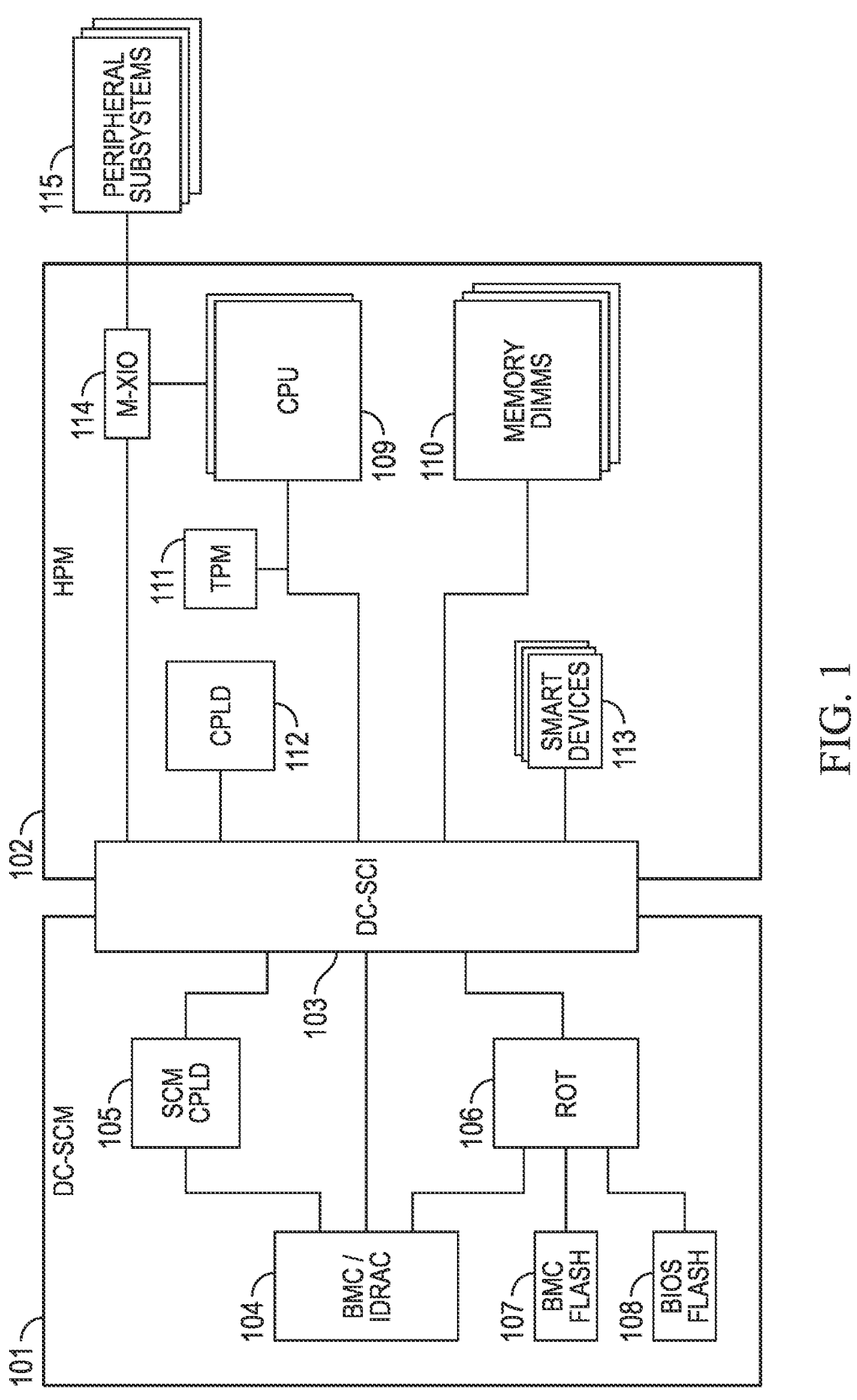
FIG. 1 is a block diagram illustrating multi-node building blocks of a DC-MHS according to one embodiment of the present disclosure.

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Modular server architectures give cloud service providers a variety of compute choices to meet market and business conditions, offer flexible configurations, and deliver innovative solutions. The Datacenter-Modular Hardware System (DC-MHS), which may be considered to form at least part of an IHS, provides interoperability between datacenter, edge, and enterprise infrastructure using consistent interfaces and modular building blocks. DC-MHS standardizes various Host Processor Module (HPM) form factors and provides supporting elements for interoperability of HPMs across various platforms. The HPM is managed by a Datacenter-Secure Control Module (DC-SCM), which is designed to enable a common management and security infrastructure across platforms within a data center. The interface between the DC-SCM and the HPM is referred to as the Datacenter-Secure Control Interface (DC-SCI).

The HPM is a traditional CPU-memory device with the Baseboard Management Controllers (BMC) and security functions moved to the DC-SCM. HPMs are not limited to a standard processor architecture and can apply any processor architecture utilizing management and security features.

IHS vendors are manufacturing ever increasingly complex, and composable Hardware systems. A single IHS can now have an (ever expanding) number of CPLDs. CPLD Vendors offer Secured CPLDs, but the secured CPLDs often cost more for Secure Boot and Attestation Capabilities. DC-MHS uses mutual authentication between subsystems to provide the same level of assurance as if they were a single complete motherboard with no interchange capabilities. While the interchange capabilities provided by DC-MHS has enhanced the configurability of IHSs, these capabilities can create security breaches when bad actors (e.g., hackers) are able to configure illicit subsystems on otherwise secured IHSs.

Secured CPLDs support Identity/Attestation abilities to perform Mutual Authentication, but such features often incur a surcharge (e.g., approximately three dollars per CPLD). Additionally, secured CPLDs can negatively impact continuity of CPLD supply. For example, adding additional hardware requirements (e.g., purpose built authenticator ICs) often decrease Motherboard Supply Chain Agility (MSCA). Vendors may have future use cases where Trusted Partners HPMs could be obtained without being modified for their supply chain. But introducing complex CPLD Logic (e.g., SPDM, Advanced Cryptographic capabilities, etc.) often has development and on-CPLD storage cost. This may be particularly problematic given that memory resources on CPLDs is often limited. Scalability may also be needed, as number of CPLDs per system is expected to continue to grow over time. As will be described in detail herein below, embodiments of the present disclosure provide a systems and methods for secure modular hardware binding using an encrypted secret key that is shared between a platform RoT, a DC-SCM, and a HPM associated with the DC-SCM.

FIG. 1 is a block diagram illustrating multi-node building blocks of a DC-MHS according to one embodiment of the present disclosure. DC-SCM 101 is coupled to HPM 102 via DC-SCI 103. The DC-SCM 101 consists of a BMC 104, which is a specialized service processor that monitors the physical state of the server. As a non-limiting example of a BMC 104, the integrated Dell Remote Access Controller (iDRAC) from DELL, INC. is embedded within DELL® PowerEdge servers and provides functionality that helps information technology (IT) administrators at remote operations centers deploy, update, monitor, and maintain servers with no need for any additional software to be installed.

A complex programmable logic device (DC-SCM CPLD) 105 contains application specific logic and a high-speed and scalable Low-voltage differential signaling Tunneling Protocol & Interface (LTPI). A Roots of Trust (RoT) Security Processor 106 is responsible for attesting the BMC, BIOS, and/or other firmware images on the system. BMC Flash 107 consists of one or more flash devices used to contain the BMC firmware image. BIOS Flash 108 consist of one or more flash devices used to contain the BIOS firmware image for each node.

HPM 102 represents a general form factor that allows for maximum input/output (I/O) of CPUs 109 in the accessible slots. HPM 102 also includes memory or Dual In-line Memory Modules (DIMMs) 110. The HPM 102 form factor does not require a specific CPU 109 or memory 110 technology. Various HPM 102 form factors support different numbers of CPUs 109 and memory slots 110. The HPM specifications are adapted to allow multiple generations of compute core designs to fit into the form factor specification so that chassis and system designs can be reused as desired.

Trusted Platform Modules (TPM) 111 provide hardware-based, security-related functions for CPUs 109 through integrated cryptographic keys. CPLD 112 supports data exchange between DC-SCM CPLD 105 and HPM 102 using LPTI. In other configurations, HPM 102 may include other hardware components (not shown), such as memory devices, graphics processing units (GPU), peripheral I/O, etc.

HPM 102 may also include one or more smart devices 113, such as a Smart Network Interface Card (NIC), which is a programmable device used to improve data center networking performance, security, features, and flexibility. Other smart devices (e.g., CPLDs 112) may include, for example, smart network interface cards (SmartNIC), data processing units (DPU), and infrastructure processing units (IPU).

In the DC-MHS environment an Extensible I/O (M-XIO) source connector 114 enables connectivity to peripheral subsystems 115. M-XIO 114 is a universal hardware API intended to enable the connectivity requirements of multiple different peripheral modules 115 without requiring a connector hardware. M-XIO 114 connector on HPM 102 includes a set of sideband signals that relies on circuitry to serialize/deserialize virtual wires that are tunneled over a 1-wire interface, called the Modular-Peripheral Sideband Tunneling Interface (M-PESTI). Peripheral subsystems 115 may include, for example, EDSFF (Enterprise and Datacenter Standard Form Factor) devices, RAID (Redundant Array of Independent Disks) controllers, PCIe Peripheral Component Interconnect Express (PCIe) CEM (Card Electro-Mechanical) cards, back planes, and OCP NIC 3.0 adapter cards. Other hardware interfaces and connectors to couple HPM 102 to chassis infrastructure elements and subsystems may follow the Platform Infrastructure Connectivity (M-PIC) specification.

DC-MHS provides a family of specifications to enable interoperability between datacenter and enterprise infrastructure by providing consistent interfaces and form factors among modular building blocks. For example, the Open Compute Project® is developing the following HPM specifications. The Modular Hardware System Full Width Specification (M-FLW) is an HPM form factor specification that is optimized for using the full width of a standard rack-mountable server. The Modular Hardware System Partial Width Density Optimized Specification (M-DNO) is an HPM specification that is targeted to partial width, such as half-width or three-quarters-width, form factors.

The DC-SCM design simplifies the deployment of HPMs and increases the efficiency for time to market deployment for new systems. The DC-SCM has a standardized pinout and definition, which provides common boot, monitoring, control, and remote debug for diverse platforms.

DC-SCI 103 supports several PCIe bus options between DC-SCM 101 and HPM 102, including PCIe Gen 2.0 up to PCIe Gen 5.0×1 interface, SPI interfaces, NC-SI RMII-based transport (RBT) interface, LTPI, eSPI bus, and I2C/I3C bus among others.

Figure 2:
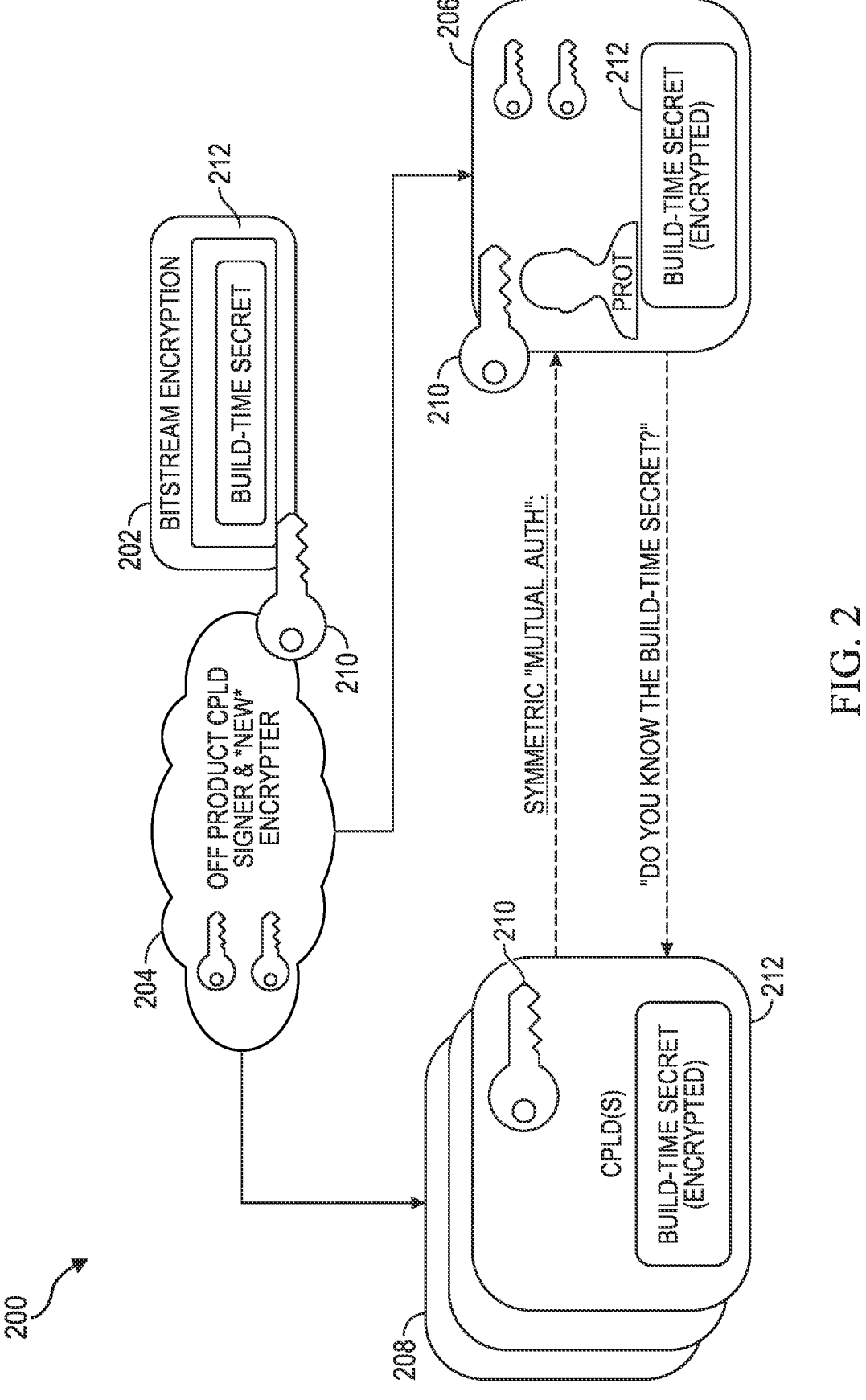
FIG. 2 illustrates an example secure modular hardware binding system according to one embodiment of the present disclosure.

FIG. 2 illustrates an example secure modular hardware binding system 200 according to one embodiment of the present disclosure. The secure modular hardware binding system 200 includes a firmware stack 202 created by a CPLD firmware signer 204 (e.g., CPLD vendor), a DC-SCM verifier 206 (e.g., a platform Root-of-Trust (RoT), BMC, etc.), and one or more CPLDs 208 configured in a DC-SCM. The firmware stack 202 is installed on one of the CPLDs 208, such as when the CPLD 208 is manufactured by the CPLD vendor 204 or whenever the CPLD 208 is updated with a new firmware stack 202. According to embodiments of the present disclosure, each of the CPLD vendor 204, DC-SCM verifier 206, and CPLD 208 stores a copy of a shared encrypted secret key 210 for secure authentication of the CPLD 208 when used in the DC-SCM.

As shown, the unencrypted key 210 and its encrypted key 212 is stored in the firmware stack 202. When a triggering event occurs (e.g., DC-SCM power on, power on request, etc.), the secure modular hardware binding system 200 triggers a symmetric mutual authentication to prove possession of the encrypted secret key by the CPLD 208. In certain embodiments, the secure modular hardware binding system 200 may be simpler, compact (e.g., reduced code size), and more efficient than other security protocols and practices, such as TLS, SPDM, runtime-nonce, etc.). For example, the secure modular hardware binding system 200 may be useful for high-end storage appliances as well as low-end switches and/or gateways that have limited storage capacities.

Figure 3:
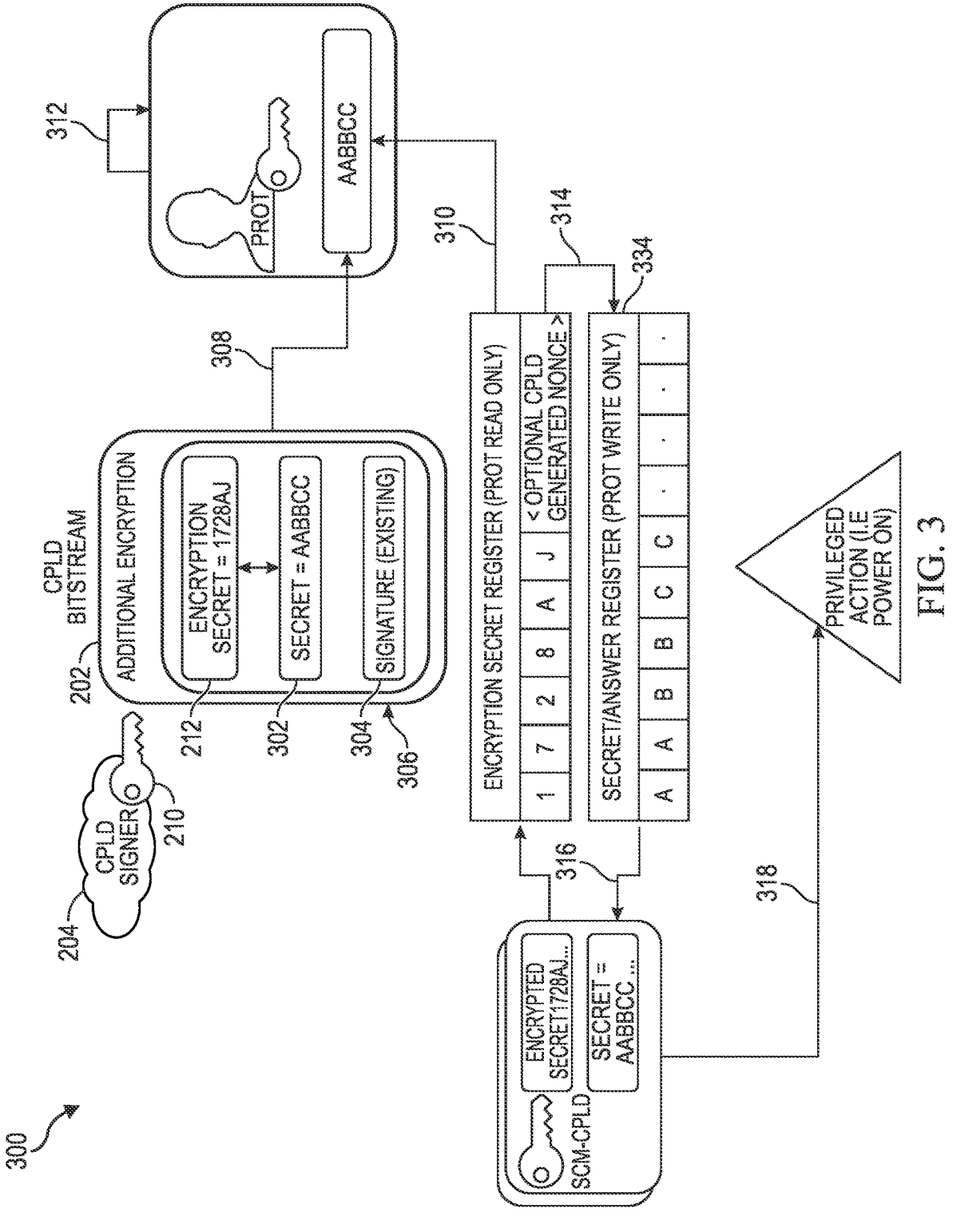
FIG. 3 illustrates another example secure modular hardware binding method showing how a Complex Programmable Logic Device (CPLD) may authenticated with a Datacenter-Modular Hardware System (DC-SCM) verifier according to one embodiment of the present disclosure.

FIG. 3 illustrates another example secure modular hardware binding method 300 showing how the CPLD 208 may authenticated with the DC-SCM verifier 206 according to one embodiment of the present disclosure. Initially at step 302, the CPLD firmware signer 204 signs an unencrypted key 210, and encrypts the signed key to form the encrypted secret key 212. In other embodiments, the CPLD firmware signer 204 may encrypt the unencrypted key 210 first, followed by signing the encrypted key to form the encrypted key 212. The unencrypted key 210 may be any suitable type. For example, the unencrypted key 210 may be a secret random key generated by a random number generator. Thereafter at step 304, the CPLD firmware signer 204 stores the unencrypted key 210 along with the signed encrypted key 212 inside of a firmware stack 202. The firmware stack 202 may be, for example, one that is shipped to end user (e.g., customer) with its associated CPLD 208, or firmware update to be applied to an in-service CPLD 208. At step 306, the CPLD firmware signer 204 optionally encrypts the firmware stack 202 with the unencrypted key 210 along with the signed encrypted key 212 stored inside.

When the firmware stack 202 is shipped to the end user (e.g., installed in the CPLD 208), at step 308, the verifier 206 optionally decrypts the firmware stack 202, retrieves the unencrypted key 210 and the signed encrypted key 212, and stores the unencrypted key 210 and signed encrypted key 212 for later use. While steps 302-308 may be performed each time a firmware stack 202 is created and sent or otherwise shipped to the end user for installation on its associated CPLD 208, steps 310-318 may be performed each time the CPLD 208 is to be authenticated for use in the DC-SCM by the verifier 206. For example, steps 310-318 may be performed each time the CPLD 208 is powered on, or the DC-SCM (e.g., IHS) in which it is configured is powered on.

At step 310, the CPLD 208 presents its version of the encrypted secret key 212 to the verifier 206. In one embodiment, the CPLD 208 may expose a read only secret register to the verifier 206. Thereafter at step 312, the verifier 206 compares the encrypted secret key 212 provided by the CPLD 208 with its stored version of the encrypted secret key 212 to verify the authenticity of the CPLD 208. In other embodiments, the verifier 206 may encrypt its stored unencrypted secret key 210 to form its version of the encrypted secret key 212 and compare that the encrypted secret key 212 that it received from the CPLD 208 to verify the authenticity of the CPLD 208.

At step 314, the verifier 206 decrypts the encrypted secret key 212 provided by the CPLD 208 and stores it in a protected register 334 for consumption by the CPLD 208. In one embodiment, the protected register 334 may be a verifier write only register that can only be written to by the verifier 206. Thereafter at step 316, the CPLD 208 compares the unencrypted secret key 210 stored in the register 334 with its version of the unencrypted secret key 210 to verify the authenticity of the verifier 206. If the comparisons performed at steps 312 and 316 are successful, the CPLD 208 is granted privileged status at step 318. That is, the DC-SCM may use the CPLD 208 in a normal manner because the secure modular hardware binding method 300 has authenticated that the firmware stack 202 in the CPLD 208 is valid. Otherwise, if either of the comparisons performed at steps 312 and 316 are not successful, the CPLD 208 may be inhibited from operating normally. For example, the secure modular hardware binding method 300 may quarantine the CPLD 208 and/or generate an alert message that an invalid firmware stack 202 is attempting to function in the DC-SCM.

Figure 4:
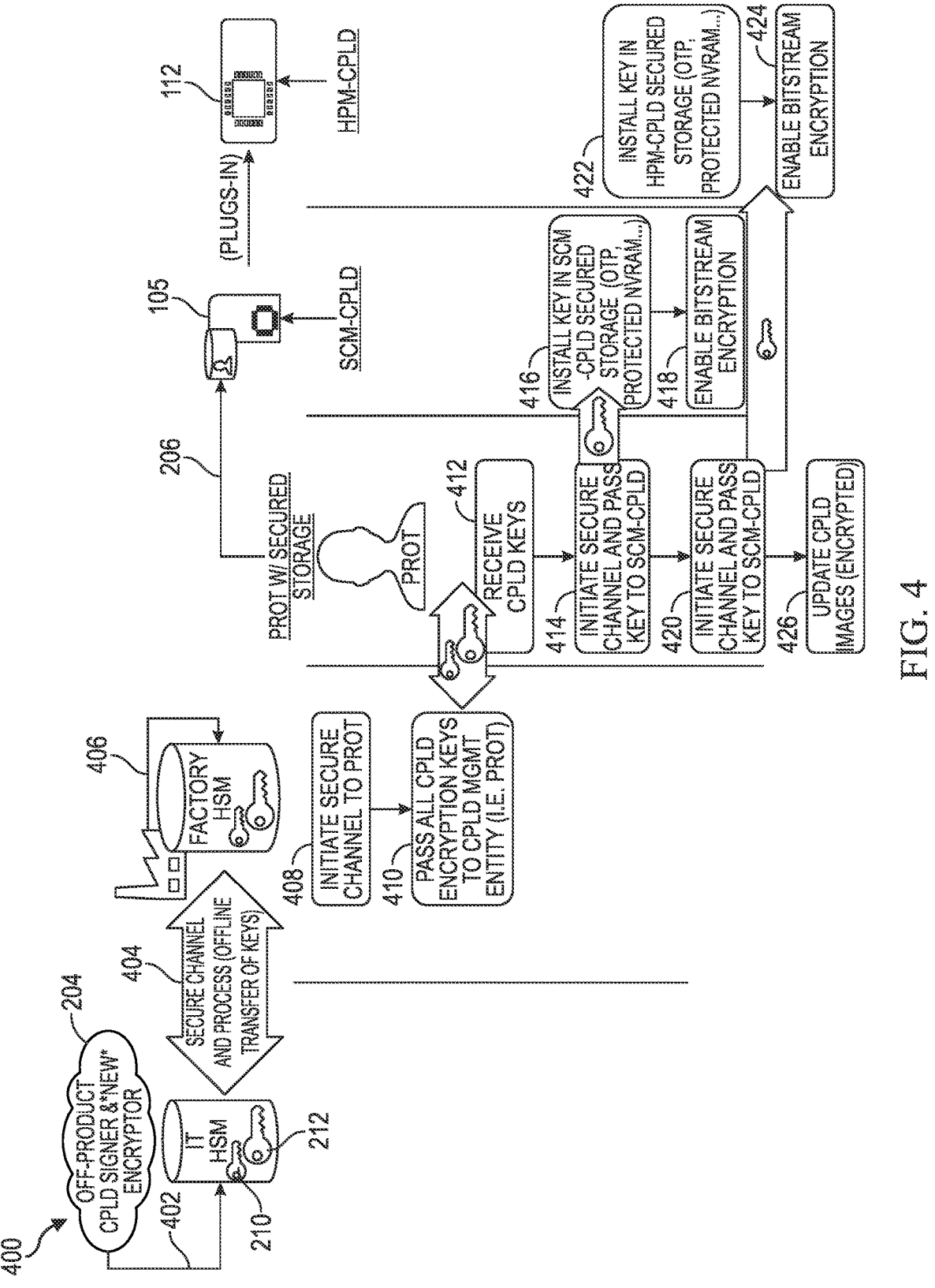
FIG. 4 illustrates an example key distribution method that may be performed by the secure modular hardware binding system to distribute the unencrypted secret key and encrypted secret key to the verifier and CPLD according to one embodiment of the present disclosure.

FIG. 4 illustrates an example key distribution method 400 that may be performed by the secure modular hardware binding system 200 to distribute the unencrypted secret key 210 and encrypted secret key 212 to the verifier 206 and CPLD 208. In one embodiment, the key distribution method 400 may perform at least a portion of step 308 described above with reference to FIG. 3. Initially at step 402, the CPLD firmware signer 204 generates the unencrypted secret key 210 and encrypted secret key 212, and stores them in a memory device, such as a database. For example, the CPLD firmware signer 204 may generate unencrypted secret key 210 and encrypted secret key 212 for each of multiple CPLDs 208 that they provide to end users, as well as for each of multiple (e.g., makes/models) firmware stacks 202 (e.g., firmware updates) that are to be maintained for each make/model of CPLD 208.

At step 404, the key distribution method 400 establishes a secure channel, and sends the unencrypted secret key 210 and encrypted secret key 212 to an end user of the CPLD 208. The end user then stores the unencrypted secret key 210 and encrypted secret key 212 in their memory storage (e.g., database) at step 406. For example, the end user may use an IHS with instructions stored in a memory and executed by a process to perform the various features described herein. At step 408, the end user then initiates a secure channel to a verifier 206. The verifier 206 may be any suitable device that is in communication with the SCM-CPLD 105 and HPM-CPLD 112. In one embodiment, the verifier 206 may be a BMC configured in the DC-SCM that is configured to manage its operation. The end user then passes the unencrypted secret key 210 and encrypted secret key 212 to a suitable CPLD management entity, such as the verifier 206. The verifier 206 receives the unencrypted secret key 210 and encrypted secret key 212 at step 412, and initiates a secure channel to pass the unencrypted secret key 210 and encrypted secret key 212 to the SCM-CPLD 105 at step 414.

At step 416, the SCM-CPLD 105 installs the unencrypted secret key 210 and encrypted secret key 212 in a secure storage, such as One Time Programmable (OTP) storage, protected NVRAM, and the like, and enables firmware stack encryption at step 418. The verifier 206 also initiates a secure channel to the HPM-CPLD 112 at step 420 in which the HPM-CPLD 112 installs the unencrypted secret key 210 and encrypted secret key 212 in its secure storage at step 422. The HPM-CPLD 112 may also enable firmware stack encryption as shown at step 424. Lastly, the verifier 206 updates (e.g., encrypts) the CPLD firmware stack 202 in memory at step 426. At this point, the verifier 206, SCM-CPLD 105 and HPM-CPLD 112 all have a copy of the unencrypted secret key 210 and encrypted secret key 212 so that the secure modular hardware binding system 200 may be used to validate the firmware stack 202 of that CPLD 208 on an as needed basis.

Figure 5:
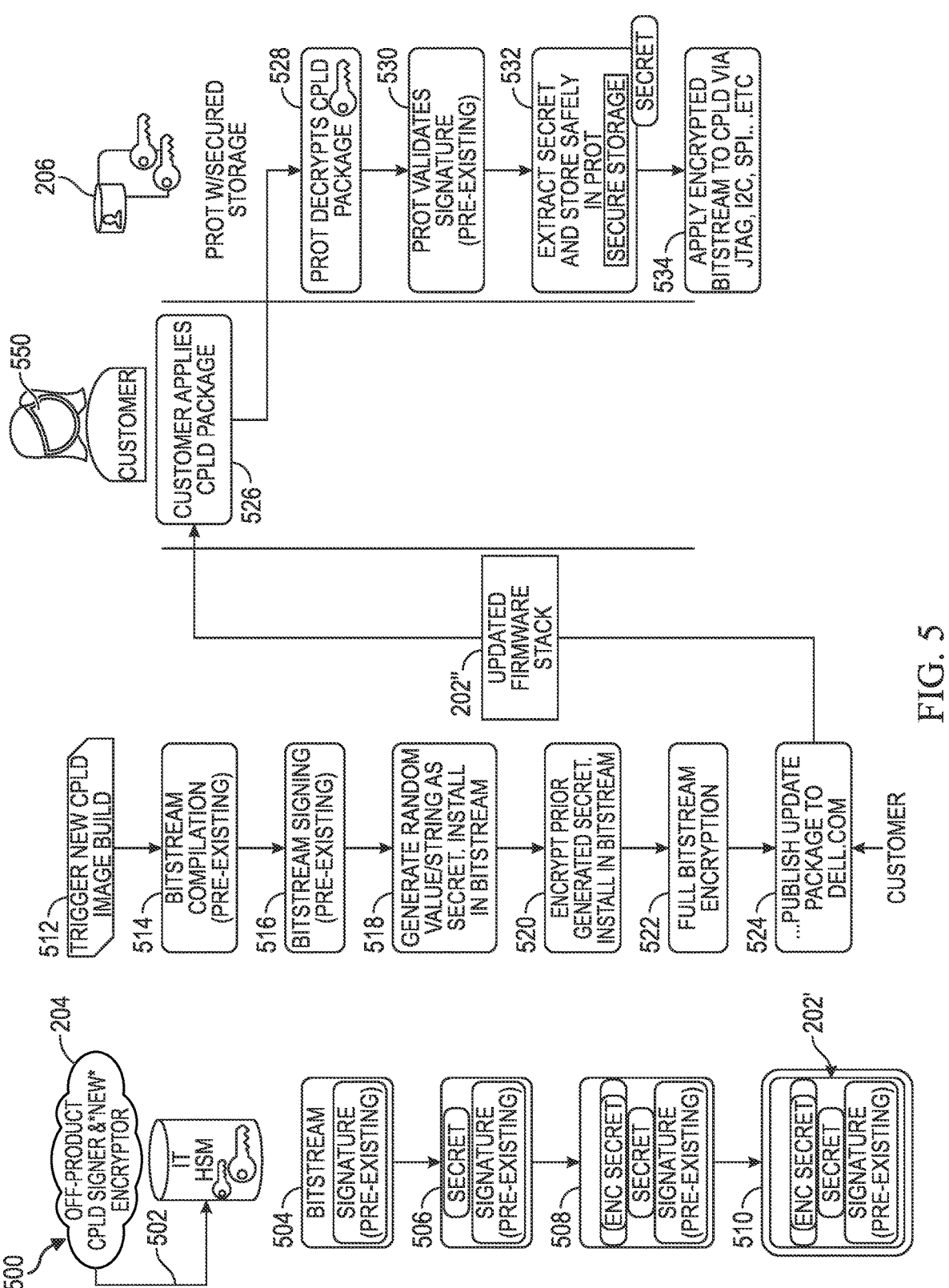
FIG. 5 illustrates an example firmware stack build time method that may be performed to generate firmware stacks for use with the secure modular hardware binding system according to one embodiment of the present disclosure.

FIG. 5 illustrates an example firmware stack build time method 500 that may be performed to generate firmware stacks 202 for use with the secure modular hardware binding system according to one embodiment of the present disclosure. The firmware stack build time method 500 generally involves a CPLD firmware signer 204 that generates an initial firmware stack 202' for a CPLD, and at a later point in time, generates an updated firmware stack 202" for that CPLD. Generally speaking, steps 502-510 may be performed any time an original firmware stack 202' is to be generated, while steps 512-534 detail actions that may be performed each time a new firmware stack 202" (e.g., firmware update) is generated for that CPLD 208.

Initially at step 502, the CPLD firmware signer 204 generates the unencrypted secret key 210 and encrypted secret key 212, and stores them in a memory device, such as a database. The firmware stack build time method 500 then creates an original firmware stack 202' at step 504, installs a secret in the original firmware stack 202' at step 506, encrypts the secret at step 508, and then encrypts the original firmware stack 202' at step 510. The encrypted original firmware stack 202' is then installed on its CPLD 208 and placed in service by the end user 550 (e.g., customer).

Later on, a need arises for a new firmware stack 202" (firmware update) at step 512. At this point, the CPLD firmware signer 204 generates a new firmware stack 202" at step 514, signs the firmware stack 202" at step 516, generate a new secret at step 518, and encrypts the prior generated secret and install it in the original firmware stack 202" at step 520. The prior generated secret is the one encrypted and installed in the original firmware stack 202'. At step 522, the firmware stack build time method 500 encrypts the new firmware stack 202", and publishes the new firmware stack 202" for use by the customer 550 at step 524.

After the new firmware stack 202" has been published, the customer 550 initiates installation of the new firmware stack 202" at step 526. The verifier 206 then decrypts the new firmware stack 202" using the original key obtained from the original firmware stack 202' at step 528, validates the signature (secret) at step 530, and extracts the unencrypted secret key 210 and encrypted secret key 212 of the new stack 202" at step 532. The verifier 206 then applies the new firmware stack 202" to the CPLD 208 at step 534.

Thus as can be seen, the encrypted secret key of the original firmware stack 202' may be used to validate (e.g., ensure trust) in the new firmware stack 202". Steps 512-534 may be performed each time a new firmware stack 202" is generated and installed on the CPLD 208. Nevertheless, when use of the firmware stack build time method 500 is no longer needed or desired, the firmware stack build time method 500 ends.

Figure 6:
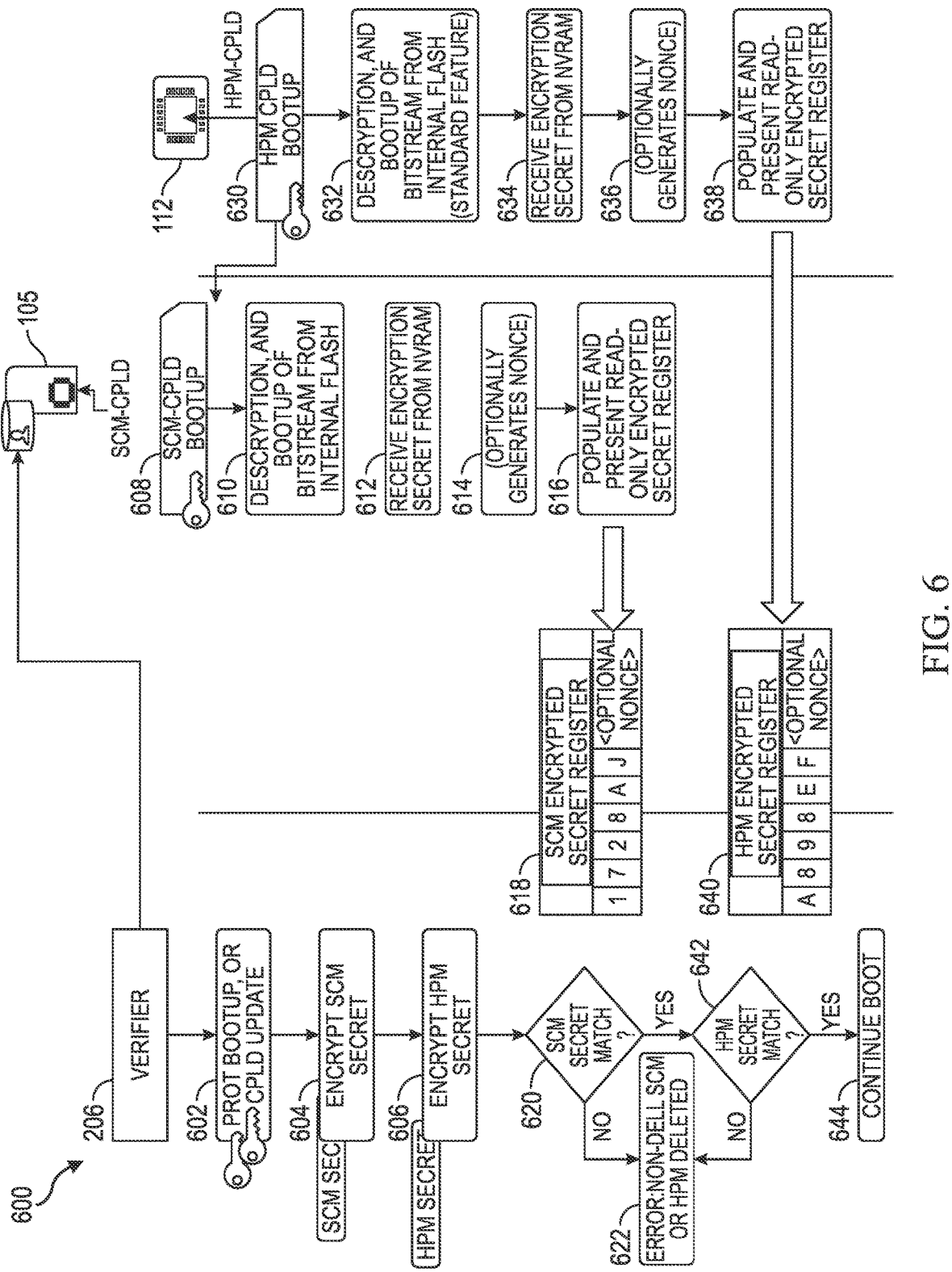
FIG. 6 illustrates an example CPLD authentication method that may be performed to authenticate CPLDs in a DC-SCM environment according to one embodiment of the present disclosure.

FIG. 6 illustrates an example CPLD authentication method 600 that may be performed to authenticate CPLDs 208 in a DC-SCM environment according to one embodiment of the present disclosure. The CPLD authentication method 600 may be performed any time validation of the SCM-CPLD is desired. For example, the CPLD authentication method 600 may be performed following a CPLD update (e.g., the CPLD is installed with a new firmware stack), and/or each time the CPLD 208 and/or DC-SCM environment is booted. Initially, the verifier 206, SCM-CPLD 105 and HPM-CPLD 112 have been distributed with the unencrypted secret key 210 and encrypted secret key 212 such as described herein above.

Initially at step 602, the verifier 206 (e.g., BMC) is booted or a firmware update has been performed on at least one of the SCM-CPLD 105 or HPM-CPLD 112. At step 604, the verifier 206 encrypts its version of the SCM-CPLD 105, and at step 606 encrypts its version of the HPM-CPLD 112. When the SCM-CPLD 105 is booted at step 608, it performs decryption and bootup at step 610, and retrieves the encrypted secret key 212 at step 612. Additionally, the SCM-CPLD 105 may optionally generate a nonce at step 614. The SCM-CPLD 105 then records the encrypted secret key 212 in a read only register 618 that can only be accessed by the verifier 206 at step 616.

At step 620, the verifier 206 determines whether the version of the encrypted secret key 212 stored by the SCM-CPLD 105 in the read only register 618 is valid (e.g., matches its version of the encrypted secret key 212). If so, processing continues at step 642; otherwise, processing continues at step 622 in which the SCM-CPLD 105 is deemed to be invalid, and an error message issued.

Steps 630-642 describe actions that may be taken to verify the authenticity of the HPM-CPLD 112. When the HPM-CPLD 112 is booted at step 630, it performs decryption and bootup at step 632, and retrieves the encrypted secret key 212 at step 634. Additionally, the HPM-CPLD 112 may optionally generate a nonce at step 634. The HPM-CPLD 112 then records its version of the encrypted secret key 212 in a read only register 640 at step 638 that can only be accessed by the verifier 206.

At step 642, the verifier 206 determines whether the version of the encrypted secret key 212 stored by the HPM-CPLD 112 in the read only register 640 is valid (e.g., matches its version of the encrypted secret key 212). If so, processing continues at step 644 in which both CPLDs 208 are deemed to be valid and the DC-SCM environment (e.g., IHS) is allowed to start in the normal manner. If, however, encrypted secret key 212 stored in the read only register 640 is not valid, processing continues at step 622 in which the HPM-CPLD 112 is deemed to be invalid, and an error message issued.

Thus as can be seen, the firmware stacks 202 of some, most, or all CPLDs 208 in the DC-SCM environment may be verified for authenticity by the verifier 206 (e.g., BMC). The CPLD authentication method 600 described above may be repeatedly performed each time the DC-SCM environment is booted or when one or more CPLD updates are performed. Nevertheless, when use of the CPLD authentication method 600 is no longer needed or desired, the process ends.

Figure 7:
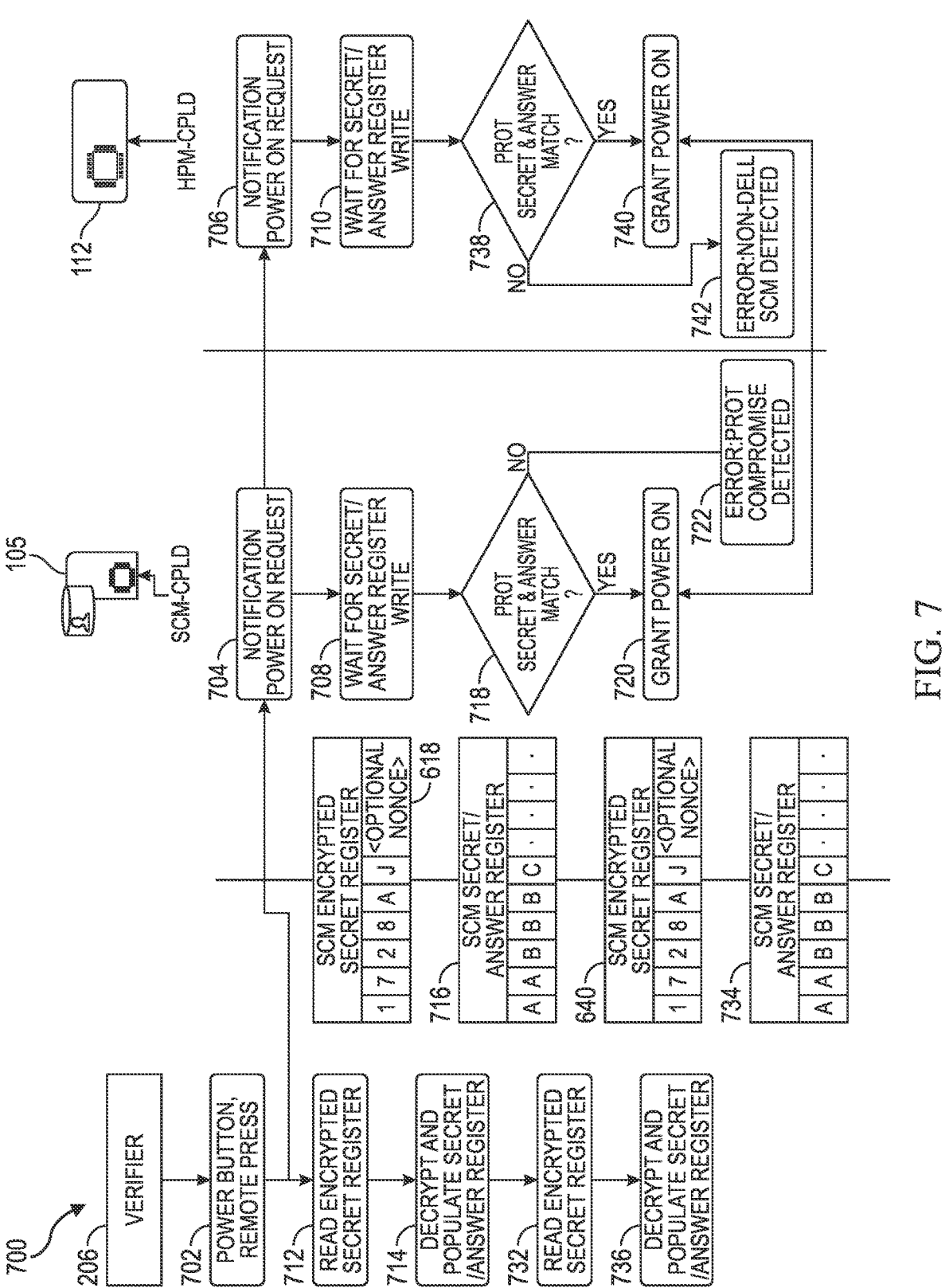
FIG. 7 illustrates an example CPLD mutual authentication method that may be performed by the secure modular hardware binding system according to one embodiment of the present disclosure.

FIG. 7 illustrates an example CPLD mutual authentication method 700 that may be performed by the secure modular hardware binding system according to one embodiment of the present disclosure. The CPLD mutual authentication method 700 may be performed in conjunction with the CPLD authentication method 600 of FIG. 6 so that not only does the verifier 206 authenticate the validity of the firmware stacks 202 on the SCM-CPLD 105 and HPM-CPLD 112, but that the SCM-CPLD 105 and HPM-CPLD 112 may also authenticate the validity of the firmware stacks 202 on the verifier 206.

Initially at step 702, the DC-SCM environment (e.g., IHS) is turned on (booted). At steps 704 and 706, both the SCM-CPLD 105 and HPM-CPLD 112 detect the power on condition, and each issues a power on request to the verifier 206. At steps 708 and 710, both the SCM-CPLD 105 and HPM-CPLD 112 enter a waiting period for the verifier 206 to respond.

When the SCM-CPLD 105 records the encrypted secret key 212 in the read only register 618 as described above at step 616, the verifier 206 reads the encrypted secret key 212 at step 712, decrypts the encrypted secret key 212, and populates a secret answer register 716 with the decrypted secret key 210 at step 714. When the SCM-CPLD 105 reads the secret answer register 716, it determines whether the decrypted secret key 210 matches at step 718. If it matches, the verifier is deemed to be valid by the SCM-CPLD 105 and power on is granted by the SCM-CPLD 105 at step 720. If, however, the decrypted secret key 210 does not match, the verifier 206 is deemed to be invalid and an error message issued at step 722.

Steps 730-740 generally describe actions that may be taken for the HPM-CPLD 112 to verify the authenticity of the verifier 206. When the HPM-CPLD 112 records the encrypted secret key 212 in the read only register 640 as described above at step 730, the verifier 206 reads the encrypted secret key 212 at step 732, decrypts the encrypted secret key 212, and populates a secret answer register 734 with the decrypted secret key 210 at step 736. When the HPM-CPLD 112 reads the secret answer register 734, it determines whether the decrypted secret key 210 matches at step 738. If it matches, the verifier 206 is deemed to be valid by the HPM-CPLD 112 and power on is granted by the HPM-CPLD 112 at step 740. If, however, the decrypted secret key 210 does not match, the verifier 206 is deemed to be invalid and an error message issued at step 742.

Although FIGS. 3, 4, 5, 6, and 7 describe several example methods 300, 400, 500, 600, and 700 for secure binding of CPLDs, the features of the methods 300, 400, 500, 600, and 700 may be embodied in other specific forms without deviating from the spirit and scope of the present disclosure. For example, either of the methods 300, 400, 500, 600, and 700 may perform additional, fewer, or different operations than those described in the present examples. For another example, either of the methods 300, 400, 500, 600, and 700 may be performed in a sequence of steps different from that described above. As yet another example, certain steps of either of the methods 300, 400, 500, 600, and 700 may be performed by other components than those described above.

Figure 8A:
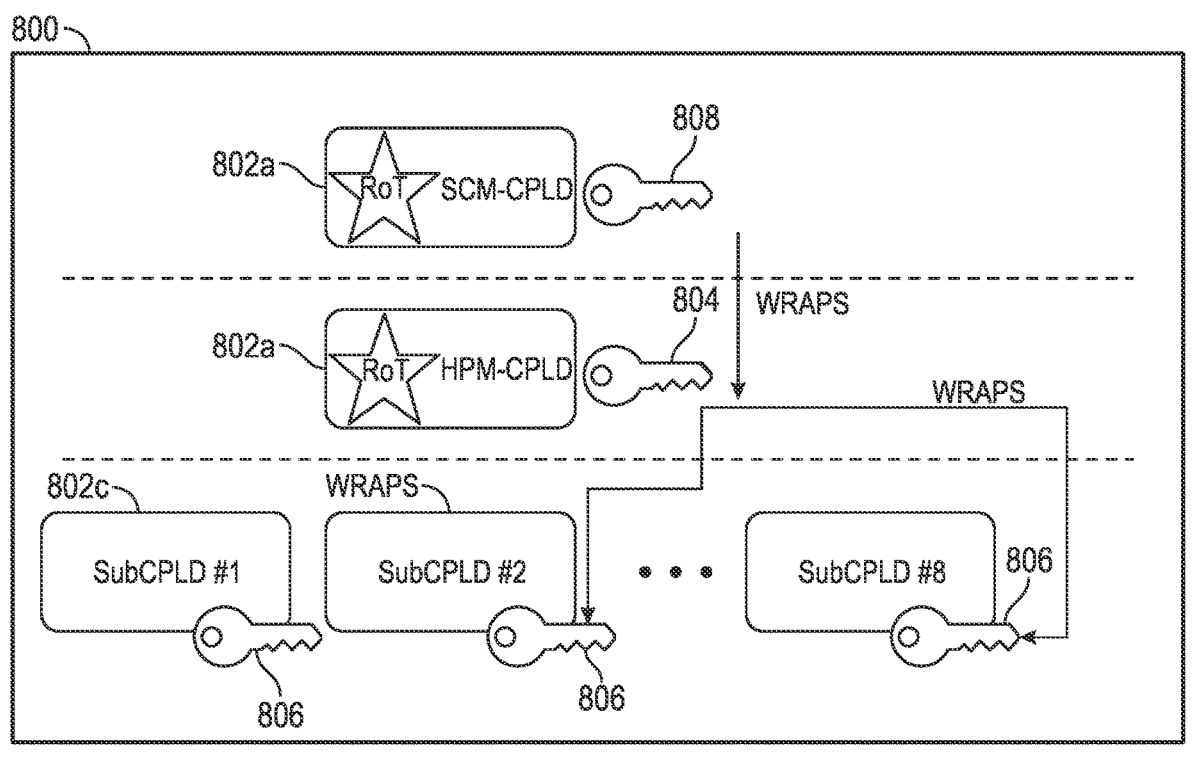
FIGS. 8A and 8B illustrate an example CPLD firmware encryption key hierarchy that may be used to hierarchically wrap at different levels according to one embodiment of the present disclosure.
Figure 8B:
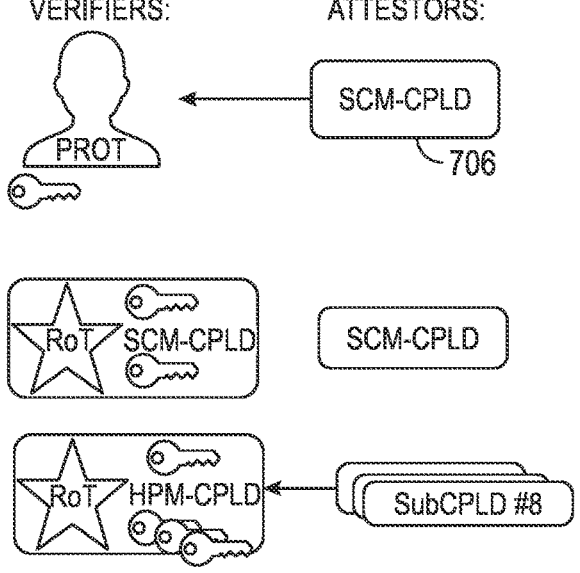

FIGS. 8A and 8B illustrate an example CPLD firmware encryption key hierarchy 800 that may be used to hierarchically wrap at different levels according to zone embodiment of the present disclosure. Currently, a single product (e.g., DC-SCM, IHS, server, etc.) is often configured with over eight CPLDs 208. Thus, maintaining trust can become unwieldy if authentication were to be conducted in a linear fashion; that is, one platform RoT has the responsibility of authenticating all other CPLDs 208 in a product. As shown, the CPLDs 208 in a product (e.g., DC-SCM environment) may be arranged in different levels, namely a top level 802a, one or more intermediate levels 802b, and a bottom (e.g., leaf) level 802c. While the particular embodiment is shown with three different levels 802a-c (collectively 802), it should be understood that the CPLDs 208 may be arranged in any number of levels such as two levels or more than three levels.

In the particular embodiment shown, the SCM-CPLD 105 is arranged in the top level 802a, the HPM-CPLD 112 is arranged in the intermediate level 802b, while several sub-CPLDs 208 are arranged in the bottom level 802c. In the CPLD firmware encryption key hierarchy 800, the HPM-CPLD encryption key 804 may wrap the subCPLD encryption keys 806. That is, the HPM-CPLD may function as a verifier for the subCPLDs as best shown in FIG. 8B. Also, SCM-CPLD encryption key 808 may wrap the CPLD encryption key 804 in which the SCM-CPLD may function as a verifier for the HPM-CPLD as shown in FIG. 8B. Additionally as shown in FIG. 8B, a platform RoT (e.g., BMC, off product entity, etc.) may function as a verifier for the SCM-CPLD 105. Thus as shown, the design is sufficiently simple to implement across any arrangement of hierarchical CPLDs, not only platform RoT verification. For example, the CPLD firmware encryption key hierarchy 800 may be less cost sensitive than secured CPLDs, and in these scenarios CPLD<–>CPLD Mutual Symmetric authentication can be achieved with this simple key wrapping schema.

In accordance with the foregoing, embodiments of the present systems and methods provide secure temporary privileged access to nodes in a cluster. To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks.

Program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices.

Similarly, operational data may be identified and illustrated herein within modules and may be embodied in any suitable form and organized within any suitable type of data structure. Operational data may be collected as a single data set or may be distributed over different locations including over different storage devices.

Reference is made herein to "configuring" a device or a device "configured to" perform some operation(s). This may include selecting predefined logic blocks and logically associating them. It may also include programming computer software-based logic of a retrofit control device, wiring discrete hardware components, or a combination thereof. Such configured devices are physically designed to perform the specified operation(s).

Various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs.

As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS) comprising: a plurality of Complex Programmable Logic Devices (CPLDs); at least one memory coupled to at least one processor, the at least one memory having program instructions stored thereon that, upon execution by the at least one processor, cause the instructions to, for each of the CPLDs: store an encrypted secret key of a previous firmware version of the first CPLD in a platform Root-of-Trust (RoT) and a first of the CPLDs; receive, by the platform RoT, a request to authenticate a new firmware stack installed on the first CPLD, wherein the new firmware stack has been encrypted with the encrypted secret key of the previous firmware version of the first CPLD; present, by the first CPLD, an encrypted secret key to the platform RoT; decrypt, by the platform RoT, the encrypted secret key using the stored version of the encrypted secret key of the previous firmware version of the first CPLD; authenticate, by the platform RoT, the new firmware stack by comparing the encrypted secret key received from the first CPLD with the stored version of the encrypted secret key; and allow operation of the first CPLD based on the authentication.

2. The IHS of claim 1, wherein the program instructions, upon execution, further cause IHS to: receive, by the platform RoT and the first CPLD, the encrypted secret key from a CPLD signer that stores the encrypted secret key.

3. The IHS of claim 2, wherein the first CPLD signer comprises a vendor of the CPLD.

4. The IHS of claim 1, wherein the platform RoT comprises a second one of the CPLDs.

5. The IHS of claim 4, wherein the first CPLD comprises a Host Processor Module-Complex Programmable Logic Device (HPM-CPLD) and the second CPLD comprises a Secure Control Module-Complex Programmable Logic Device (SCM-CPLD), wherein the IHS comprises a Data Center-Secure Control Module (DC-SCM).

6. The IHS of claim 1, wherein the program instructions, upon execution, further cause the IHS to:

obtain the encrypted secret key from the new firmware stack, wherein the encrypted secret key was installed in the new firmware stack by a first CPLD signer.

7. The IHS of claim 1, wherein the program instructions, upon execution, further cause IHS to: decrypt, by the platform RoT, the encrypted secret key to derive an unencrypted secret key; present, by the platform RoT, the unencrypted secret key to the first CPLD; authenticate, by the CPLD, the new firmware stack by comparing the unencrypted secret key received from the platform RoT with the stored version of the unencrypted secret key; and allow operation of the first CPLD based on the authentication.

8. A secure modular hardware binding method comprising, for each of a plurality of Complex Programmable Logic Devices (CPLDs): storing an encrypted secret key of a previous firmware version of the first CPLD in a platform Root-of-Trust (RoT) and a first of the CPLDs; receiving, by the platform RoT, a request to authenticate a new firmware stack installed on the first CPLD, wherein the new firmware stack has been encrypted with the encrypted secret key of the previous firmware version of the first CPLD; presenting, by the first CPLD, an encrypted secret key to the platform RoT; decrypting, by the platform RoT, the encrypted secret key using the stored version of the encrypted secret key of the previous firmware version of the first CPLD; authenticating, by the platform RoT, the new firmware stack by comparing the encrypted secret key received from the first CPLD with the stored version of the encrypted secret key; and allowing operation of the first CPLD based on the authentication.

9. The secure modular hardware binding method of claim 8, further comprising: receiving, by the platform RoT and the first CPLD, the encrypted secret key from a first CPLD signer that stores the encrypted secret key, wherein the first CPLD signer comprises a vendor of the first CPLD.

10. The secure modular hardware binding method of claim 8, further comprising:

obtaining the encrypted secret key from the new firmware stack, wherein the encrypted secret key was installed in the new firmware stack by a first CPLD signer.

11. The secure modular hardware binding method of claim 8, further comprising: decrypting, by the platform RoT, the encrypted secret key to derive an unencrypted secret key; presenting, by the platform RoT, the unencrypted secret key to the first CPLD; authenticating, by the first CPLD, the new firmware stack by comparing the unencrypted secret key received from the platform RoT with the stored version of the unencrypted secret key; and allowing operation of the first CPLD based on the authentication.

12. A computer program product comprising a non-transitory computer readable storage medium having program instructions stored thereon that, upon execution by a Datacenter-Modular Hardware System (DC-MHS), cause the DC-MHS to, for each of a plurality of Complex Programmable Logic Devices (CPLDs): store an encrypted secret key of a previous firmware version of the first CPLD in a platform Root-of-Trust (RoT) and a first of the CPLDs; receive, by the platform RoT, a request to authenticate a new firmware stack installed on the first CPLD, wherein the new firmware stack has been encrypted with the encrypted secret key of the previous firmware version of the first CPLD; present, by the first CPLD, an encrypted secret key to the platform RoT; decrypt, by the platform RoT, the encrypted secret key using the stored version of the encrypted secret key of the previous firmware version of the first CPLD; authenticate, by the platform RoT, the new firmware stack by comparing the encrypted secret key received from the first CPLD with the stored version of the encrypted secret key; and allow operation of the first CPLD based on the authentication.

13. The computer program product of claim 12, wherein the program instructions, upon execution, further cause DC-MHS to: receive, by the platform RoT and the first CPLD, the encrypted secret key from a CPLD signer that stores the encrypted secret key, wherein the first CPLD signer comprises a vendor of the first CPLD.

14. The computer program product of claim 12, wherein the program instructions, upon execution, further cause DC-MHS to:

obtain the encrypted secret key from the new firmware stack, wherein the encrypted secret key was installed in the new firmware stack by a first CPLD signer.

15. The computer program product of claim 12, wherein the program instructions, upon execution, further cause DC-MHS to: decrypt, by the platform RoT, the encrypted secret key to derive an unencrypted secret key; present, by the platform RoT, the unencrypted secret key to the first CPLD; authenticate, by the first CPLD, the new firmware stack by comparing the unencrypted secret key received from the platform RoT with the stored version of the unencrypted secret key; and allow operation of the first CPLD based on the authentication.

\* \* \* \* \*